United States Patent [19]
Lee

[11] Patent Number: 5,644,214
[45] Date of Patent: Jul. 1, 1997

[54] POWER FACTOR CORRECTION CIRCUIT

[75] Inventor: Hoon-chul Lee, Kyungki-do, Rep. of Korea

[73] Assignee: Samsung Electronics Co., Ltd., Suwon, Rep. of Korea

[21] Appl. No.: 338,758

[22] Filed: Nov. 10, 1994

[30]     Foreign Application Priority Data

Nov. 16, 1993 [KR] Rep. of Korea ............... 93-24280

[51] Int. Cl.⁶ ..................................... G05F 1/70
[52] U.S. Cl. ................ 323/211; 323/222; 323/243; 323/288
[58] Field of Search ........................ 323/211, 217, 323/222, 242, 243, 288, 289

[56]           References Cited

U.S. PATENT DOCUMENTS

| | | | |
|---|---|---|---|
| 5,003,454 | 3/1991 | Bruning | 323/222 |
| 5,367,247 | 11/1994 | Blocher et al. | 323/222 |
| 5,371,667 | 12/1994 | Nakao et al. | 363/124 |

*Primary Examiner*—Shawn Riley

[57]         ABSTRACT

A continuous current type power factor correction circuit in a power device having rectifying means for rectifying an alternating current, a booster converter having an inductor, a diode and a capacitor series connected to an output terminal of the rectifying means, a control switch connected in parallel with the series connection of the diode and capacitor, and a load connected across the capacitor for outputting a boosted direct current to the load according to switching operation of the control switch, and a power factor correction circuit controlling the switching operation of the control switch, the power factor correction circuit, comprising; an off-time controller comparing a first voltage signal with a second voltage signal and generating an off signal in response to the comparison, an on-time controller generating an on signal in accordance with a charge time period of the capacitor, the charge time period being determined from a point in time wherein the off-time controller generates the off signal, and a drive signal generator, respectively receiving the off and on signals, latching the off and on signals, and generating a drive signal which controls operation of the control switch.

4 Claims, 4 Drawing Sheets

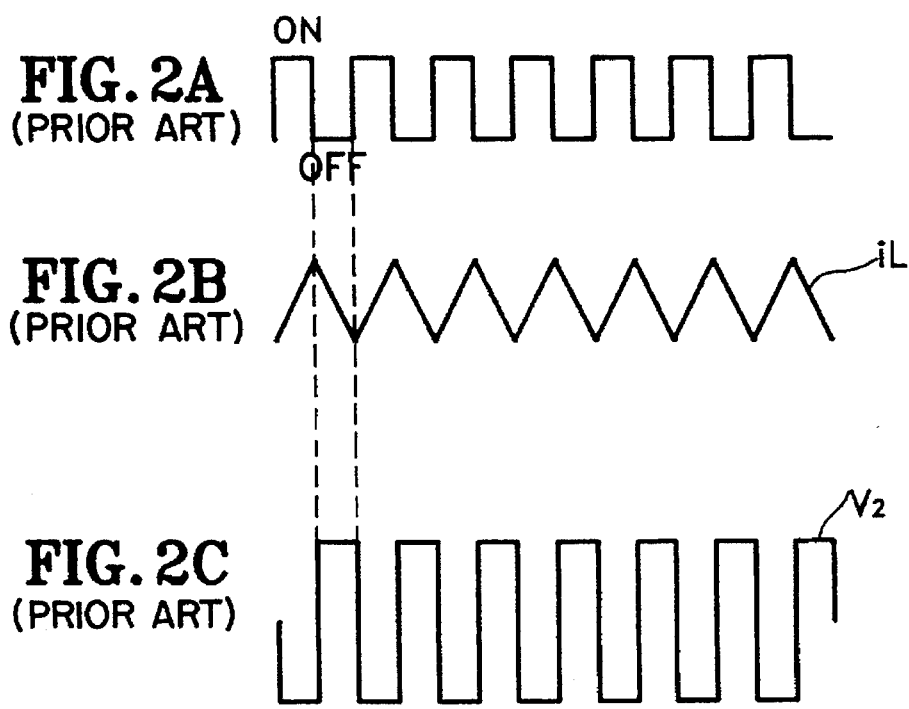
FIG. 2A (PRIOR ART)
FIG. 2B (PRIOR ART)
FIG. 2C (PRIOR ART)
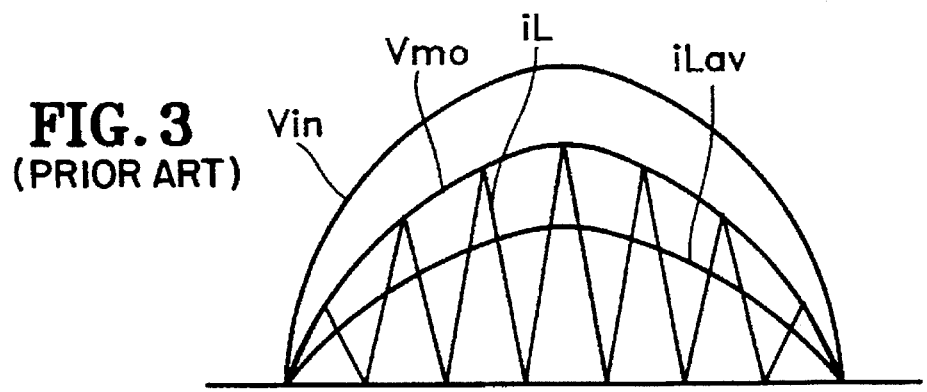
FIG. 3 (PRIOR ART)

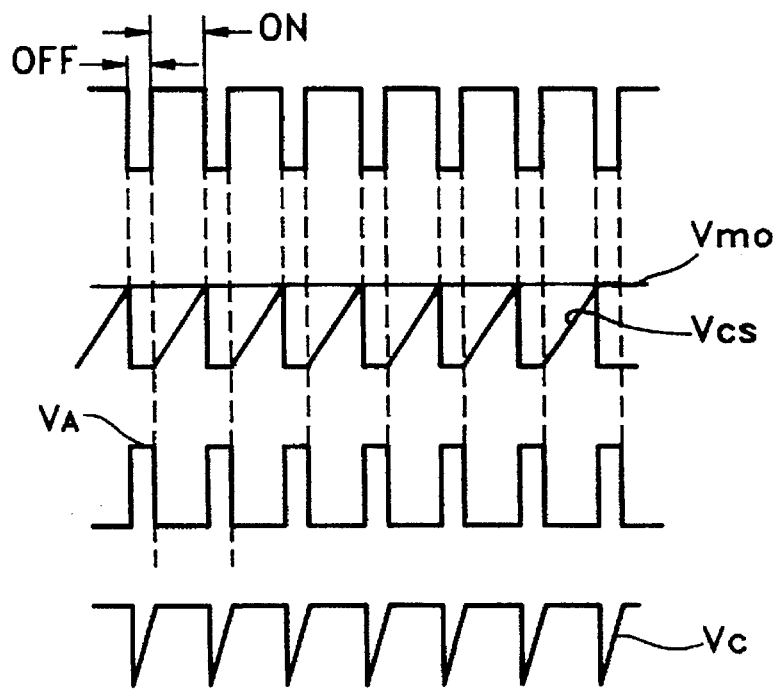
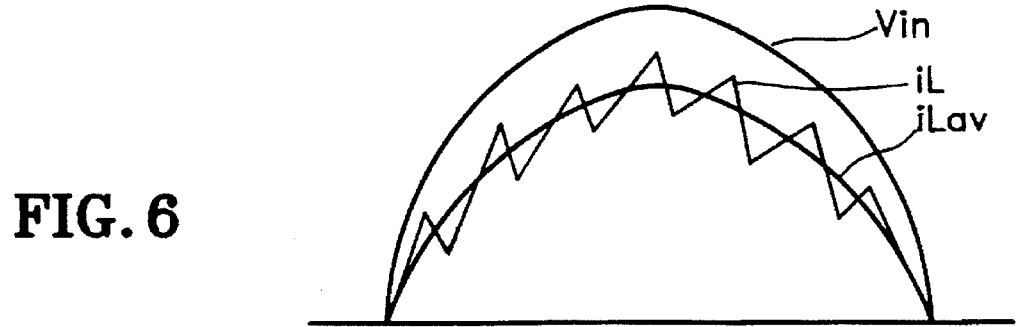
FIG. 6

POWER FACTOR CORRECTION CIRCUIT

BACKGROUND OF THE INVENTION

The present invention relates to a power factor correction circuit. More particularly, the present invention relates to a continuous current control type power factor correction circuit.

Reference is made to commonly assigned, U.S. patent application Ser. No. 08/083,233, filed Jun. 29, 1993. This prior application also relates to a continuous current control type power factor correction circuit. In general, the "power factor" of an electrical circuit is defined as the ratio of active power to apparent power. That is, when an AC voltage (E) and AC current (I) have a phase angle difference ($\alpha$), the apparent power is EI and an active power is EIcos$\alpha$. Therefore, the power factor (EIcos$\alpha$/EI) is expressed as cos$\alpha$.

One form of conventional power factor correction devices improve power factor by providing a load terminal, or an input terminal, to which power is supplied through such passive components as a resistor or a capacitor. Unfortunately, these conventional power factor correction devices have input currents which vary with their loading. Thus, even though power factor improvement is achieved for one particular system, the input current cannot be actively determined according to a change in the load or input voltage.

Another form of conventional power factor correction device obtains an improved power factor by controlling the current of a booster converter using the control circuit of a zero current switching (ZCS) system. For this type of power factor correction circuit, input current is controlled discontinuously along a full-wave rectified input line voltage. The input current is swung heavily from zero to peak value. Thus, noise, for example, hum, is generated and it is difficult to obtain a large average input current. That is, using a discontinuous current control type power correction circuit in a large power system is difficult.

FIG. 1 is a circuit diagram showing a conventional discontinuous current control type power factor correction circuit. In FIG. 1, the discontinuous current control type power factor correction circuit detects the state change of the primary winding current iL of a transformer 18 connected to a line 11 by employing the secondary winding current of transformer 18 and a resistor 24 and controls control switch 22. As shown in FIG. 2A, when the primary winding current of transformer 18 increases at a slope having the predetermined value shown in FIG. 2B by means of turning on control switch 22, the secondary winding voltage has the waveform as shown in FIG. 2C. Thereafter, the appropriate level voltage $V_{mo}$, as shown in FIG. 3, where the divided value of an input line voltage $V_{in}$ and a voltage $V_L$ of load 34 are combined, and the voltage $V_{cs}$ corresponding to the primary winding current of transformer 18 detected by resistor 24, are compared by a comparator 44. When $V_{cs}$ is larger than $V_{mo}$, control switch 22 is turned off. When control switch 22 is turned off, secondary winding voltage $V_2$ of transformer 18 goes high, as shown in FIG. 2C, and the primary winding current of transformer 18 decreases at the slope shown in FIG. 2B. As the slope is decreased to zero, secondary winding voltage $V_2$ of transformer 18 is held high, until reaching the zero point of the slope of the primary winding current, as shown in FIG. 2C. However, when the slope of the primary winding current iL of transformer 18 reaches the zero point, secondary winding voltage $V_2$ immediately goes low.

When control switch 22 is turned on using the above-described voltage change, input current is increased, as shown in FIG. 3, by the quick switching operation of control switch 22. When control switch 22 is turned off, the input current is decreased. In other words, as shown in FIG. 3, the peak of controlled current follows the proportional value of the line voltage, and is shaped as a triangle wave. Accordingly, an average value of the triangle wave is a sinusoidal wave having the same phase as that of the voltage waveform.

Unfortunately, the discontinuous current control type power factor correction device adopting ZCS system is difficult to use for high power applications due to the following reasons. Input line current swings from zero to peak current as the input line current follows the waveform of the input line voltage, and thus, in order to have a large average value of an input current, the peak value of the input current must be greatly enlarged. As a result, the associated booster converter device is over-stressed. In addition, the resulting ripple produces a bothersome humming noise.

SUMMARY OF THE INVENTION

Accordingly, it is an object of the present invention to provide a continuous current control type power factor correction circuit which improves power factor and removes harmonic noise by continuously controlling the input current to a power terminal in order to generate a sine wave having a phase the same as that of an input voltage.

It is another object of the present invention to provide a continuous current control type power factor correction circuit which reduces the swing width of an input line current by means of controlling the on time of a control switch according to a capacitor charge time, such that resulting input line current swing is suitably low for use in high power systems.

To accomplish the objects of the present invention, there is provided a continuous current type power factor correction circuit in a power device having rectifying means for rectifying an alternating current, a booster converter having an inductor, a diode and a capacitor series connected to an output terminal of the rectifying means, a control switch connected in parallel with the series connection of the diode and capacitor, and a load connected across the capacitor for outputting a boosted direct current to the load according to switching operation of the control switch, and a power factor correction circuit controlling the switching operation of the control switch, the power factor correction circuit, comprising; an off-time controller comparing a first voltage signal with a second voltage signal and generating an off signal in response to the comparison, an on-time controller generating an on signal in accordance with a charge time period of the capacitor, the charge time period being determined from a point in time wherein the off-time controller generates the off signal, and a drive signal generator, respectively receiving the off and on signals, latching the off and on signals, and generating a drive signal which controls operation of the control switch.

As above, "on" time can be controlled by employing a charge time of the capacitor which reduces current swing width. Current ripple is also suppressed using this configuration making the present invention is particularly well suited to large power systems.

BRIEF DESCRIPTION OF THE DRAWINGS

The above objects and other advantages of the present invention will become more apparent upon consideration of the preferred embodiment described below with reference to the attached drawings in which:

FIG. 2 shows an output waveform of each part of the circuit shown in FIG. 1;

FIG. 3 is a graphical representation illustrating current versus voltage characteristic of the circuit shown in FIG. 1;

FIG. 5 shows an output waveform of each part of the circuit shown in FIG. 4; and FIG. 6 is a graphical representation illustrating current versus voltage characteristic of the circuit shown in FIG. 4.

DETAILED DESCRIPTION OF THE INVENTION

The present invention will be explained in more detail with reference to the attached drawings.

Figure 1:
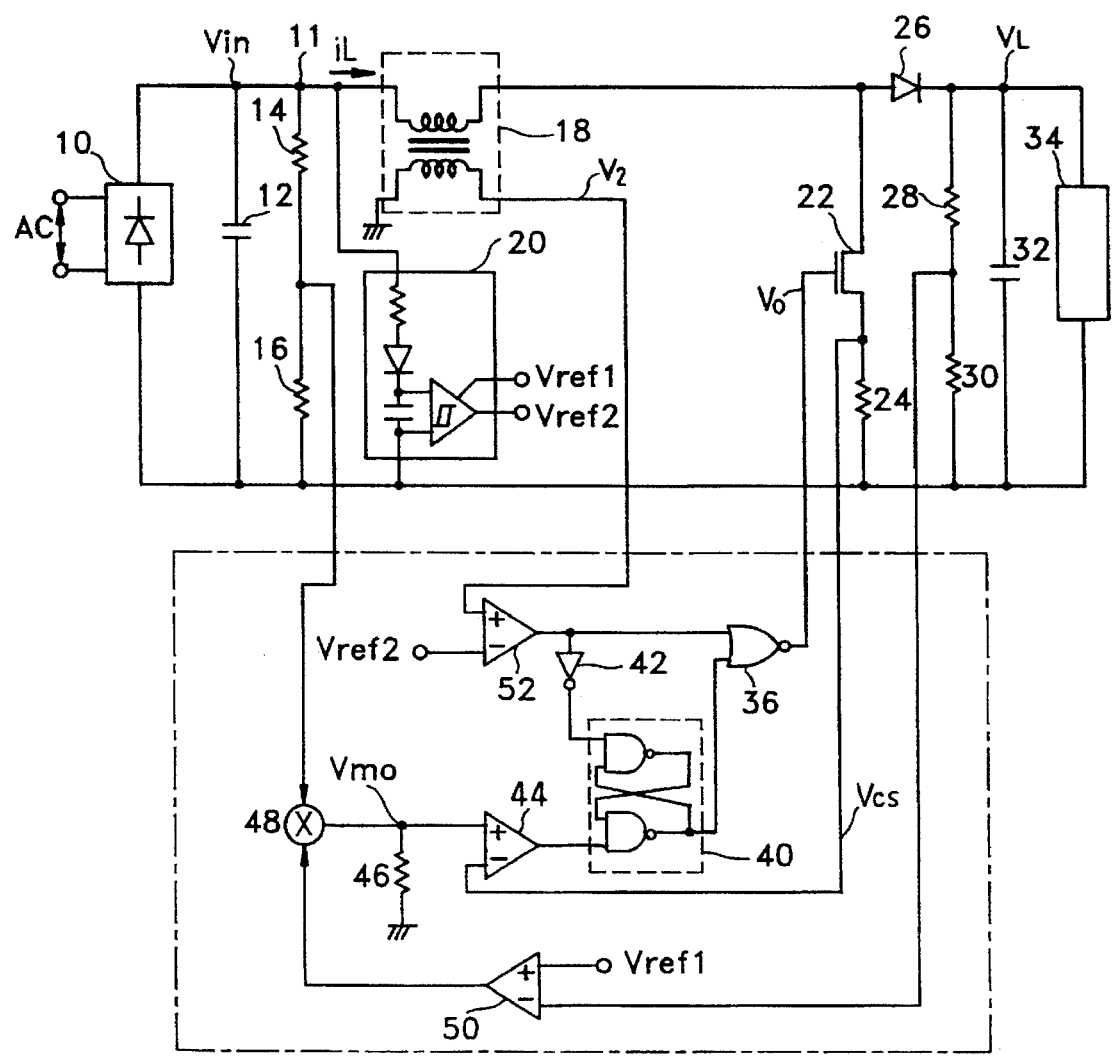
FIG. 1 is a circuit diagram of a conventional power factor correction circuit.
Figure 4:
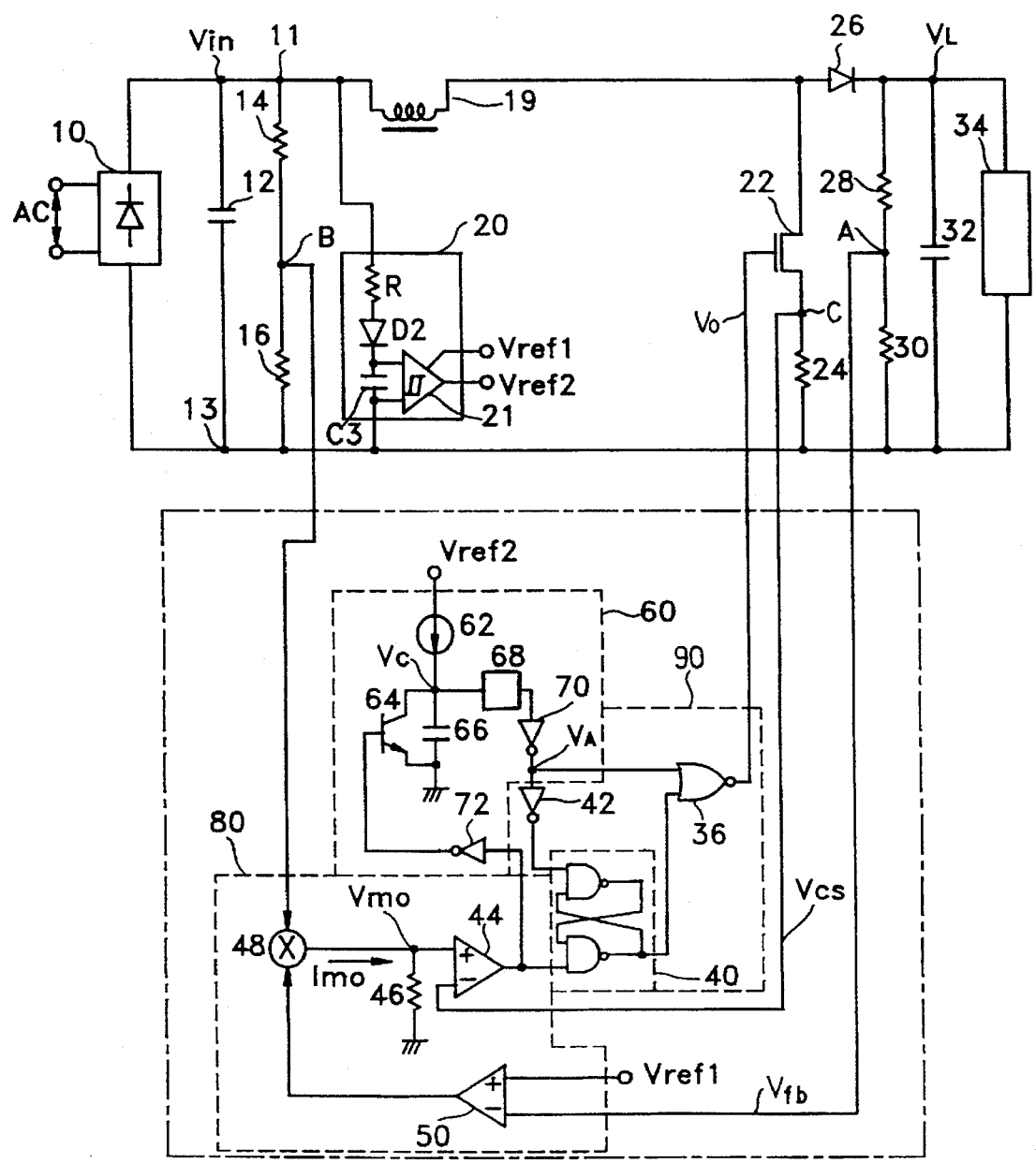
FIG. 4 is a circuit diagram of a power factor correction circuit according to one embodiment of the present invention.

Referring to FIG. 4, one embodiment of the present invention comprises an off-time controller 80 for comparing a voltage signal including a current corresponding to an output voltage of a booster converter and a current corresponding to an input voltage applied to an output terminal of a rectifying circuit, with a voltage signal corresponding to a current signal passing through a control switch, and generating an "off" signal of the control switch, an on-time controller 60 for generating an "on" signal of the control switch by a charge time of a capacitor counted from the point of generating the "off" signal of off-time controller 80, and a driving signal generator 90 for receiving "off" and "on" signals, latching the "off" and "on" signals and generating a driving signal for driving the control switch.

In a booster converter, one terminal 11 of a bridge rectifying circuit 10 is connected one terminal of an inductor 19 whose other terminal is connected to an anode of a diode 26, and one terminal of control switch 22 is connected between inductor 19 and the anode of diode 26 with the other terminal thereof being connected to the other terminal 13 (i.e., ground) of rectifying circuit 10 via a resistor 24. In power factor correction circuit, serial resistors 28, 30 and a capacitor 32 are connected in parallel between a cathode of diode 26 and terminal 13 of rectifying circuit 10, and series resistors 14, 16 and a capacitor 12 are connected in parallel between terminals 11 and 13 of rectifying circuit 10.

In off-time controller 80 of the power factor correction circuit, cathode of diode 26 is connected to a point A between resistors 28 and 30 in parallel with capacitor 32. The voltage apparent at point A is connected to the inverting input of an error amplifier 50, and a reference voltage ($V_{ref1}$) having a predetermined value is applied to the non-inverting input of error amplifier 50. An output of error amplifier 50 is input to a multiplier 48, and value of the point B, i.e., the parallel connection point between resistors 14 and 16, is input to multiplier 48. A resistor 46 connected to an output terminal of multiplier 48 converts an output current ($I_{mo}$) of multiplier 48 into voltage value ($V_{mo}$) in proportion thereto and inputs the result to the non-inverting input of comparator 44. A point C between control switch 22 and resistor 24 is connected to the inverting input of comparator 44 so that a voltage ($V_{cs}$) applied to joint C can be input to the inverting input of comparator 44. An output of comparator 44 is applied to one input of a latch circuit 40 of driving signal generator 90. An output of comparator 44 is also applied to an input of an inverter 72 of on-time controller 60.

In on-time controller 60, an output of inverter 72 is connected to a base of a switching element 64 used for discharging the charge of a capacitor 66, and a collector of switching element 64 is connected to one terminal of each of capacitor 66, a constant current source 62 and a level shifter 68. The other terminal of capacitor 66 is connected to ground, and the other terminal of current source 62 is connected to a reference voltage ($V_{ref2}$), and an emitter of switching element 64 is connected to ground. The other terminal of level shifter 68 is applied to the input of inverter 70.

In driving signal generator 90, the output of inverter 70 of on-time controller 60 is applied to an input of inverter 42, and to an input of a NOR gate 36, simultaneously. An output of inverter 42 is applied to the other input of latch circuit 40 whose output is applied to the input of NOR gate 36. An output of NOR gate 36 drives control switch 22. Latch circuit 40 is constituted by two NAND gates.

In a voltage supply 20, a resistor R and a diode D2 are connected in serial to the common node of rectifying circuit 10 and an inductor 19. A capacitor C3 and a low-voltage lockout circuit 21 are connected in parallel and diode D2 is connected thereto, so that the low-voltage lock out circuit 21 supplies power and reference voltages $V_{ref1}$ and $V_{ref2}$ to the power factor correction circuit.

On-time controller 60, off-time controller 80 and driving signal generator 90 are integrated and constituted by a single chip. Accordingly, in an embodiment of the present invention, number of the input/output pins of chip can be reduced when power factor correction circuit is integrated.

Operation of the above-described circuit will now be explained. In order to maintain a constant output voltage $V_L$ of the booster converter, a feedback voltage $V_{fb}$, i.e., voltage obtained by distributing output voltage $V_L$ by resistors 28 and 30, is input to the inverting input of error amplifier 50, and control is performed such that, when feedback voltage $V_{fb}$ is higher than voltage $V_{ref1}$, the output value of error amplifier 50 decreases, and when voltage $V_{fb}$ is lower than voltage $V_{ref1}$, the output value of error amplifier 50 increases.

Multiplier 48 multiplies a value obtained by distributing the rectified input line voltage $V_{in}$ by resistors 14 and 16 and the output of error amplifier 50, and outputs an output current $I_{mo}$. Current $I_{mo}$ is changed into an output voltage $V_{mo}$ by resistor 46. Therefore, voltage $V_{mo}$ maintains the waveform of input voltage $V_{in}$ while combining output voltage $V_L$ of the booster converter. Comparator 44 compares voltage $V_{mo}$ with voltage $V_{cs}$, i.e., voltage corresponding to current flowing through inductor 19 and detected by resistor 24, when control switch 22 is turned on. When voltage $V_{cs}$ becomes higher than voltage $V_{mo}$, the output of comparator 44 is low. When voltage $V_{cs}$ becomes lower than voltage $_{mo}$, the output of comparator 44 is high.

FIGS. 5A—5D illustrate the waveform showing the relationships among an output $V_o$ of power factor correction circuit, a voltage $V_{cs}$ input to the inverting input of comparator 44, an output voltage $V_A$ of on-time controller 60 and the voltage $V_c$ across capacitor 66. When control switch 22 is turned on, and thus input current $i_L$ that flows through inductor 19 is increased, voltage $V_{cs}$, i.e., voltage corresponding to input current $i_L$ detected by resistor 24, is increased. Thus, the output of comparator 44 goes low when the detected voltage $V_{cs}$ reaches output voltage $V_{mo}$ of multiplier 48. Thus, output of latch circuit 40 is high. Simultaneously, when the output of comparator 44 is low, the output of inverter 72 goes high. Since the base of switching element 64 is at a high level, switching element 64 is turned on. Thus, the voltage across capacitor 66 is low. Then, the output voltage of level shifter 68 and inverter 70, that is, output voltage $V_A$ of on-time controller 60, goes high. At this time, latch circuit 40 is reset so as to have a low output. Accordingly, since one input of NOR gate 36 is low while the other input, that is, voltage $V_A$, is high, output $V_o$ of NOR gate 36 is low. As a result, control switch 22 is turned off and input $V_{cs}$ of comparator 44 is lower than output voltage $V_{mo}$ of multiplier 48. Thus, the output of comparator 44 is high and the output of inverter 72 is low, so that switching element 64 is turned off and a charge is accumulated across capacitor 66. Thus, when voltage is increased and reaches a predetermined level, the output of level shifter 68 results in a low output of inverter 70. Accordingly, output $V_A$ of on-time controller 60 goes low and an input of NOR gate 36 goes low. Since the output of latch circuit 40 stays low in the above-described state, both inputs of NOR gate 36 are low. Thus, the output of NOR gate 36 goes high and control switch 22 is turned on. Thus, input line current $i_L$ increases. After repeating the above-described operation, an average value of input current $i_L$ becomes similar to the waveform of input voltage $V_{in}$, power factor becomes close to unity.

FIG. 6 illustrates average value $i_{Lavg}$ of the rectified input line voltage $V_{in}$, input line current in and current $i_L$. Referring to FIG. 6, it can be seen that the power factor correction circuit of the present invention enables a power factor to be improved by employing a continuous current control method and properly controlling the charge time period of capacitor 66.

In an embodiment of the present invention, on-time of a control switch is determined by a charge time period of a capacitor. Thus, in the present invention, power factor can be corrected by a continuous current method, differently from the conventional zero current method. Therefore, the present invention is suitable for suppressing ripple and for high power applications.

What is claimed is:

1. A continuous current type power factor correction circuit in a power device having a booster converter circuit having an inductor receiving a rectified AC input voltage, a diode connected in series with the inductor, and a control switch connected across the rectified AC input voltage, and a power factor correction circuit controlling the switching operation of the control switch, the power factor correction circuit, comprising:

an off-time controller having a first comparator comparing a feedback voltage signal from the booster converter circuit with a reference voltage signal, and generating an off signal in response to the comparison;

an on-time controller having a capacitor, and generating an on signal in accordance with a charge time period of the capacitor, wherein the on-time controller comprises;

a constant current source;

a capacitor charged by current supplied from the constant current source; and, a switch connected in parallel across the capacitor and being switched in response to an output of the off-time controller; and, a drive signal generator comprising a latch circuit receiving the off and on signals, latching the off and on signals, and generating a drive signal controlling operation of the control switch.

2. The continuous current type power factor correction circuit of claim 1, wherein the latch circuit of the drive signal generator comprises a flip-flop circuit having first and second inputs, the first input receiving the off signal and the second input receiving the on signal.

3. A continuous current type power factor correction circuit in a power device having a booster converter circuit having an inductor receiving a rectified AC input voltage, a diode connected in series with the inductor, and a control switch connected across the rectified AC input voltage, and a power factor correction circuit controlling the switching operation of the control switch, the power factor correction circuit, comprising:

an off-time controller having a first comparator comparing a feedback voltage signal from the booster converter circuit with a reference voltage signal, and generating an off signal in response to the comparison, and having a multiplier multiplying a signal indicative of the rectified AC input voltage from the booster converter circuit, with an output from the first comparator;

an on-time controller having a capacitor, and generating an on signal in accordance with a charge time period of the capacitor; and, a drive signal generator comprising a latch circuit receiving the off and on signals, latching the off and on signals, and generating a drive signal controlling operation of the control switch.

4. The continuous current type power factor correction circuit of claim 3, wherein the off-time controller further comprises a second comparator comparing an output from the multiplier with a signal indicative of the current flowing through the inductor, and generating the off signal as an output of the second comparator.

* * * * *